United States Patent
Wendisch

[11] 4,050,788
[45] Sept. 27, 1977

[54] BASIC LENS FOR PANCRATIC SYSTEM
[75] Inventor: Irmgard Wendisch, Trumau, Austria
[73] Assignees: Karl Vockenhuber; Raimund Hauser, both of Vienna, Austria
[21] Appl. No.: 633,088
[22] Filed: Nov. 18, 1975
[30] Foreign Application Priority Data
Nov. 18, 1974 Austria .................................. 9242/74
[51] Int. Cl.² ............................................ G02B 15/00
[52] U.S. Cl. ....................................... 350/184; 350/219
[58] Field of Search ................................. 350/219, 184
[56] References Cited
U.S. PATENT DOCUMENTS

| 3,891,304 | 6/1975 | Muszumanski et al. | 350/184 |
| 3,937,562 | 2/1976 | Muszumanski et al. | 350/184 |

Primary Examiner—John K. Corbin
Assistant Examiner—Conrad Clark
Attorney, Agent, or Firm—Fleit & Jacobson

[57] ABSTRACT

A basic lens for a pancratic camera lens system having an afocal screen of variable enlargement in which the screen includes a primary, positive front component, second and third negative components, the total focal length of the second negative component being displaceable of the optical axis and the minimum focal length of the second negative element and the image field diagonal $2_y$ having a relationship $(f_{Gmin} - f_{II}) < 6y$, and a fourth positive component, the basic lens being constructed in the form of an assembly of six lenses including, in succession beginning with the lens facing the object to be photographed, a first biconvex lens, a second biconvex lens, a first biconcave lens cemented to the second biconvex lens, a second biconcave lens, a third biconvex lens and a positive meniscus, all arranged in aligned relationship in the direction of light incidence.

3 Claims, 2 Drawing Figures

BASIC LENS FOR PANCRATIC SYSTEM

BRIEF STATEMENT OF THE INVENTION

The invention relates to a basic lens for a pancratic camera lens with an afocal screen of variable enlargement, wherein the screen has a primary, positive front component, followed by second and third negative components and finally a fourth, positive component.

BACKGROUND OF THE INVENTION

In the camera, field present day, well-known lenses, many lenses are well-known which roughly meet the demands made on them. However, they all have some substantial drawback. For example, the lenses shown in U.S. Pat. Nos. 2,029,806; 2,012,822; 2,771,006 and 2,894,431 have extremely short radii of curvature which prevents the use of conventional, low-cost manufacturing techniques. To some extend these drawbacks are somewhat overcome with a lens of the type shown in French Patent No. 1,536,308, but for such a lens, types of glass are used which contain a high percentage of thorium oxide because of their optical position, a fact which calls for strict protective measures in processing which result in high material costs.

SUMMARY OF THE INVENTION

In order to avoid such drawbacks, it is suggested that in the case of a basic lens of the type according to the invention, it be constructed from six lenses, of which the first lens, which faces the object to be photographed is biconvex, to be followed by a second biconvex lens cemented with a concavo-concave lens, behind which finally a biconcave lens, a biconvex lens and a positive meniscus, all arranged in alignment and in the direction of the light incidence.

In order to be able to satisfactorily control distortion as they appear, especially on the edge of the image field, it is advantageous to provide a refracting power for the strongest, negatively refracting surface with the most curvature in the basic lens, according to the absolute value, which is greater than one-half the sum of the three strongest, positively refracting surfaces in this basic lens.

A particularly advantageous application of the basic lens under the invention is to use the already aforementioned afocal screen. Such a screen is well-known and is shown in Austrian Patent No. 317,576. In the optical system consisting of this well-known screen and basic lens according to the invention, the action in terms of the F-number, is determined most efficiently by constructing the basic lens according to the invention.

Additional advantages and characteristics of the invention follow from the description shown diagrammatically in the drawing.

DESCRIPTION OF THE PREFERRED EMBODIMENT

Figure 1:
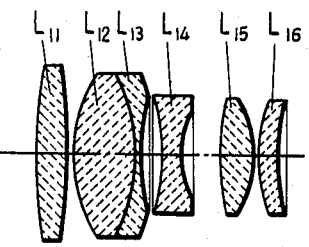
FIG. 1 shows a diagram of a basic lens in accordance with the invention.

The basic lens shown in FIG. 1 is constructed with six lenses which include a biconvex single lens $L_{11}$ facing the incident light followed by lenses $L_{12}$ and $L_{13}$ cemented together, lens $L_{12}$ being biconvex and lens $L_{13}$ being biconcave. The remaining lens which follow in the direction of the light incidence include a biconcave $L_{14}$, a biconvex lens $L_{15}$ and finally a positive meniscus $L_{16}$.

Figure 2:
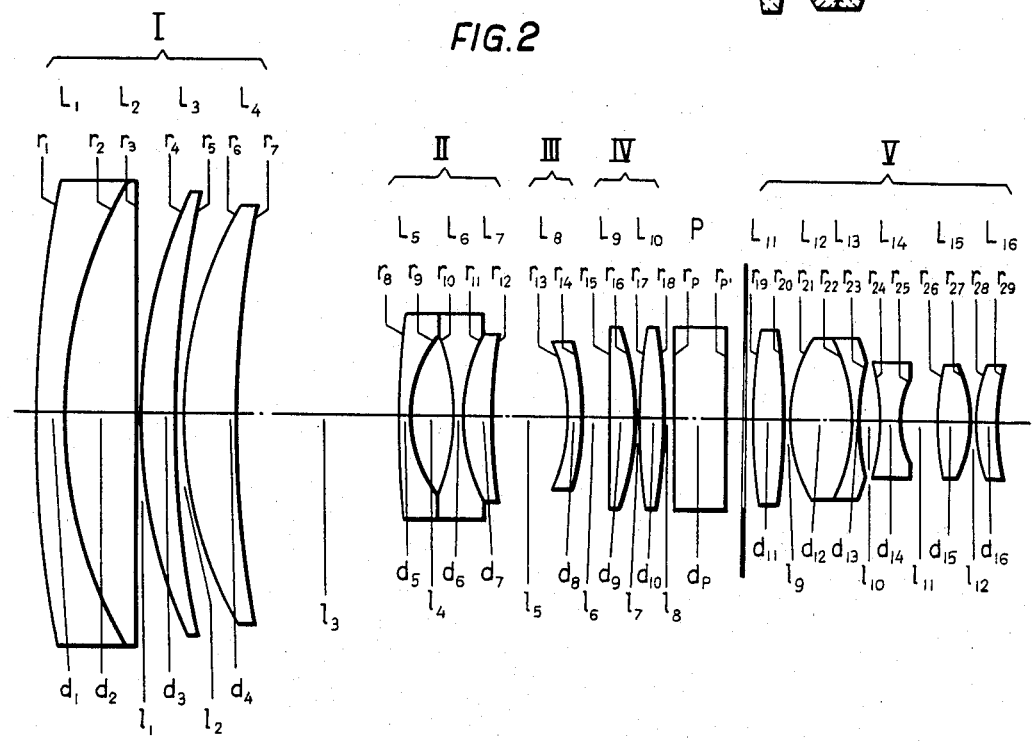
FIG. 2 shows the basic lens of FIG. 1, together with a screen of the type shown in Austrian Patent No. 317,576, in a medium setting of the focal length.

FIG. 2 shows an optical system with a basic lens according to the invention, in which the screen is being described as taken from Austrian Patent No. 317,576. This optical system includes a displaceable component II with negative focal length contiguous to fixed component I with positive focal length $f_I$ and facing an object to be photographed. The minimum total focal length of the second, negative component II and for the image field diagonal $2_y$ is determined from the following equation: $(f_{Gmin} - f_{II}) < 6_y$. Component II is displaceable lengthwise of the optical axis for the purpose of varying the total focal length. Also included is component III with negative focal length $f_{III}$ adjacent to component II, lengthwise of the optical axis. Finally fixed element IV is provided with positive focal length $f_{IV}$, which collects the diverging group of rays behind component III in such a way that the rays run concentrically in the diaphragm area.

The positively refracting surfaces ($\Phi_{21}$, $\Phi_{28}$) of the biconvex lens $L_{12}$ cemented to the biconcave lens $L_{13}$ and of the positive meniscus $L_{16}$, which face the incident light the positive refracting surface ($\Phi_{27}$) of the biconvex lens $L_{15}$ standing at the last previous position and facing the picture as well as the negative refracting surface $\Phi_{25}$ of the biconcave single lens $L_{14}$ facing the picture are in accordance with the relationship $(\Phi_{21} + \Phi_{27} + \Phi_{28}) < |2\Phi_{25}|$.

As set forth in Table A below, an example of the data for constructing the invention is set forth, this data being correlated with the deviation of radii of curvature of the individual refracting surfaces up to $\pm$ 10% of the refracting power of the corresponding component, a deviation in thickness up to $\pm$ 10% of the corresponding component, a deviation of the refracting indices ($N_d$) up to $\pm$ 0.03 and a deviation of the Abbe' numbers ($V_d$) up to $\pm$ 5.

TABLE A

| Lens | Radii | Thickness and Separation | $N_d$ | $V_d$ |
|---|---|---|---|---|
| $L_1$ | $r_1 = +9.929$ | $d_1 = 0.10$ | 1.805 | 25.4 |
| $L_2$ | $r_2 = +2.044$ | $d_2 = 0.38$ | 1.606 | 43.9 |
|  | $r_3 =$ plan | $l_1 = 0.01$ |  |  |
| $L_3$ | $r_4 = +2.482$ | $d_3 = 0.21$ | 1.620 | 60.3 |
|  | $r_5 = +7.189$ | $l_2 = 0.01$ |  |  |
| $L_4$ | $r_6 = +1.947$ | $d_4 = 0.28$ | 1.691 | 54.7 |
|  | $r_7 = +8.453$ |  |  |  |

TABLE A-continued

| Lens | Radii | Thickness and Separation | $N_d$ | $V_d$ | |
|---|---|---|---|---|---|
| | | $l_3 = \begin{matrix} 0.038 \ldots f_{min} \\ 0.763 \ldots f_M \\ 1.097 \ldots f_{max} \end{matrix}$ | | | |
| $L_5$ | $r_8 = +6.210$ | $d_5 = 0.05$ | 1.691 | 54.7 | |
| | $r_9 = +0.620$ | $l_4 = 0.21$ | | | |
| $L_6$ | $r_{10} = -1.112$ | $d_6 = 0.05$ | 1.620 | 60.3 | $f_{II} = -0.62$ |
| $L_7$ | $r_{11} = +0.888$ | $d_7 = 0.14$ | 1.805 | 25.4 | |
| | $r_{12} = +5.018$ | | | | |
| | | $l_5 = \begin{matrix} 1.204 \ldots f_{min} \\ 0.368 \ldots f_M \\ 0.145 \ldots f_{max} \end{matrix}$ | | | |
| $L_8$ | $r_{13} = -0.782$ | $d_8 = 0.05$ | 1.744 | 44.8 | |
| | $r_{14} = -1.899$ | | | | |
| | | $l_6 = \begin{matrix} 0.024 \ldots f_{min} \\ 0.135 \ldots f_M \\ 0.024 \ldots f_{max} \end{matrix}$ | | | |
| $L_9$ | $r_{15} = $ plan | $d_9 = 0.14$ | 1.620 | 60.3 | |
| | $r_{16} = -1.131$ | $l_7 = 0.01$ | | | |
| $L_{10}$ | $r_{17} = +2.659$ | $d_{10} = 0.12$ | 1.620 | 60.3 | |
| | $r_{18} = -4.235$ | $l_8 = 0.04$ | | | |
| P | $r_p = $ plan | $d_p = 0.25$ | 1.517 | 64.2 | |
| | $r_p' = $ plan | Diaphragm 0.09 + 0.05 | | | |
| $L_{11}$ | $r_{19} = +3.948$ | $d_{11} = 0.16$ | 1.720 | 50.4 | |
| | $r_{20} = -2.475$ | $l_9 = 0.01$ | | | |
| $L_{12}$ | $r_{21} = +0.676$ | $d_{12} = 0.30$ | 1.664 | 35.8 | $\Phi_{21} = +20.982$ |
| $L_{13}$ | $r_{22} = -0.835$ | $d_{13} = 0.05$ | 1.805 | 25.4 | |
| | $r_{23} = +2.399$ | $l_{10} = 0.07$ | | | |
| $L_{14}$ | $r_{24} = -1.295$ | $d_{14} = 0.11$ | 1.847 | 23.8 | |
| | $r_{25} = +0.522$ | $l_{11} = 0.19$ | | | $\Phi_{25} = -1.623$ |
| $L_{15}$ | $r_{26} = +2.482$ | $d_{15} = 0.17$ | 1.713 | 53.8 | |
| | $r_{27} = -0.576$ | $l_{12} = 0.01$ | | | $\Phi_{27} = +1.238$ |
| $L_{16}$ | $r_{28} = +0.700$ | $d_{16} = 0.12$ | 1.641 | 60.1 | $\Phi_{28} = +0.916$ |
| | $r_{29} = +1.440$ | | | | |

$f_{min} = 0.40$
$f_M = 1.00$
$f_{max} = 1.91$
Aperture ratio = 1:1.2
Image diagonal $2_y = 0.35$

What is claimed is:

1. A basic lens for a pancratic camera lens having an afocal screen of variable enlargement wherein the basic lens comprises a plurality of lenses including a first biconvex lens nearest the object to be photographed, a second biconvex lens, a first biconcave lens cemented to said second biconvex lens, a second biconcave lens, a third biconvex lens and a positive meniscus all arranged in an aligned relationship as viewed in the direction of the incident light, wherein the positively refracting surfaces ($\Phi 21$, $\Phi 28$) of said second biconvex lens cemented to said first biconcave lens and the positive meniscus, said positively refracting surfaces ($\Phi 21$, $\Phi 28$) convex to the incident light, the positively refracting surface ($\Phi 27$) of the third biconvex lens, said positively refracting surface ($\Phi 27$) convex to the picture, as well as the negatively refracting surface ($\Phi 25$) of said second biconcave lens, said negatively refracting surface ($\Phi 25$) concave to the picture, have the following values:

$$\Phi 21 + \Phi 27 + \Phi 28 = 3.14,$$
and
$$\Phi 25 = -1.62.$$

2. A basic lens according to claims 1 wherein,
$\Phi 21 = + 0.98$
$\Phi 25 = - 1.62$
$\Phi 27 = + 1.24$
$\Phi 28 = + 0.92.$ 3. Lens according to claim 1, characterized by the following data, with r designating the radii of curvature of the lens surfaces, l and d designating the axial thicknesses and separations, $n_d$ designating the indices of refraction and $V_d$ designating the Abbe numbers, $f_{min}$, $f_M$, fmax being the minimum focal length, the mean focal length and the maximum focal length, respectively, and 2 y being the length of the diagonal of the image frame:

| Lens | Radii | Thickness and Separation | $N_d$ | $V_d$ | |
|---|---|---|---|---|---|
| $L_1$ | $r_1 = +9.929$ | $d_1 = 0.10$ | 1.805 | 25.4 | |
| | $r_2 = +2.044$ | $d_2 = 0.38$ | 1.606 | 43.9 | |
| $L_2$ | $r_3 = $ plan | $l_1 = 0.01$ | | | |
| $L_3$ | $r_4 = +2.482$ | $d_3 = 0.21$ | 1.620 | 60.3 | |
| | $r_5 = +7.189$ | $l_2 = 0.01$ | | | |
| $L_4$ | $r_6 = +1.947$ | $d_4 = 0.28$ | 1.691 | 54.7 | |
| | $r_7 = +8.453$ | $l_3 = 0.763 \ldots \begin{matrix} 0.038 \ldots f_{min} \\ f_M \\ 1.097 \ldots f_{max} \end{matrix}$ | | | |
| $L_5$ | $r_8 = +6.210$ | $d_5 = 0.05$ | 1.691 | 54.7 | |
| | $r_9 = +0.629$ | $l_4 = 0.21$ | | | |
| $L_6$ | $r_{10} = -1.112$ | $d_6 = 0.05$ | 1.620 | 60.3 | $f_{II} = -0.62$ |
| $L_7$ | $r_{11} = +0.888$ | $d_7 = 0.14$ | 1.805 | 25.4 | |
| | $r_{12} = +5.048$ | $l_5 = 0.368 \ldots \begin{matrix} 1.204 \ldots f_{min} \\ f_M \\ 0.145 \ldots f_{max} \end{matrix}$ | | | |
| $L_8$ | $r_{13} = -0.782$ | $d_8 = 0.05$ | 1.744 | 44.8 | |
| | $r_{14} = -1.899$ | $l_6 = 0.135 \ldots \begin{matrix} 0.024 \ldots f_{min} \\ f_M \\ 0.024 \ldots f_{max} \end{matrix}$ | | | |
| $L_9$ | $r_{15} = $ plan | $d_9 = 0.14$ | 1.620 | 60.3 | |
| | $r_{16} = -1.131$ | $l_7 = 0.01$ | | | |
| $L_{10}$ | $r_{17} = +2.659$ | $d_{10} = 0.12$ | 1.620 | 60.3 | |
| | $r_{18} = -4.235$ | $l_8 = 0.04$ | | | |
| P | $r_p = $ plan | $d_p = 0.25$ | 1.517 | 64.2 | |
| | $r_p' = $ plan | Diaphragm $0.09 + 0.05$ | | | |
| $L_{11}$ | $r_{19} = +3.948$ | $d_{11} = 0.16$ | 1.720 | 50.4 | |
| | $r_{20} = -2.475$ | $l_9 = 0.01$ | | | |
| $L_{12}$ | $r_{21} = +0.676$ | $d_{12} = 0.30$ | | $\Phi_{21} = +0.982$ | |
| | $r_{22} = +0.835$ | $d_{13} = 0.05$ | 1.664 | 35.8 | |
| $L_{13}$ | $r_{23} = +2.399$ | $l_{10} = 0.07$ | 1.805 | 25.4 | |
| $L_{14}$ | $r_{24} = -1.295$ | $d_{14} = 0.11$ | | | |
| | $r_{25} = +0.522$ | $l_{11} = 0.19$ | 1.847 | 23.8 $\Phi_{25} = -1.623$ | |
| $L_{15}$ | $r_{26} = +2.482$ | $d_{15} = 0.17$ | 1.713 | 53.8 $\Phi_{27} = +1.238$ | |
| | $r_{27} = -0.576$ | $l_{12} = 0.01$ | | | |
| $L_{16}$ | $r_{28} = +0.700$ | $d_{16} = 0.12$ | 1.641 | $\Phi_{28} = +0.916$ 60.1 | |
| | $r_{29} = +1.440$ | | | | |

$f_{min} = 0.40$
$f_M = 1.00$
$f_{max} = 1.91$
Aperture ratio = 1:1.2
Image diagonal $2_y = 0.35$